(12) United States Patent
Lee et al.

(10) Patent No.: US 6,389,027 B1
(45) Date of Patent: May 14, 2002

(54) IP MULTICAST INTERFACE (75) Inventors: Chin Lee, Poughkeepsie; Bruce H. Ratcliff, Red Hook; Stephen R. Valley, Valatie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/139,797

(22) Filed: Aug. 25, 1998

(51) Int. Cl.[7] ................................................. H04J 3/16
(52) U.S. Cl. ...................................................... 370/401
(58) Field of Search ................................ 370/401, 351, 370/352, 465, 389, 399, 252, 241, 245, 466, 469, 471, 474, 475, 476, 408, 905, 902, 901, 911, 392, 390, 402, 403, 409; 713/153, 201, 202, 151, 160, 162; 709/224, 225, 227, 230, 248

(56) References Cited

U.S. PATENT DOCUMENTS

| | | | |
|---|---|---|---|
| 5,361,256 A | 11/1994 | Doeringer et al. | 370/60 |
| 5,570,366 A | 10/1996 | Baker et al. | 370/85.15 |
| 5,684,800 A | 11/1997 | Dobbins et al. | 370/401 |
| 5,732,071 A | 3/1998 | Saito et al. | 370/255 |
| 5,835,723 A | 11/1998 | Andrews et al. | 395/200.1 |
| 5,958,018 A | 9/1999 | Eng et al. | 709/246 |
| 5,970,066 A | 10/1999 | Lowry et al. | 370/353 |
| 6,009,467 A | 12/1999 | Ratcliff et al. | 709/224 |
| 6,016,319 A * | 1/2000 | Kshirsagar et al. | 370/410 |
| 6,046,989 A | 4/2000 | Takahashi | 370/312 |
| 6,097,720 A | 8/2000 | Araujo et al. | 370/355 |
| 6,101,180 A | 8/2000 | Donahue et al. | 370/352 |
| 6,108,782 A * | 8/2000 | Fletcher et al. | 370/245 |

* cited by examiner

Primary Examiner—Dang Ton
(74) Attorney, Agent, or Firm—Floyd A. Gonzalez; Lily Neff (57) ABSTRACT

A computer program product for use with a computer system having a host and a plurality of clients coupled to one another via a local area network (LAN), to provide a multicasting of messages using a special command set. First computer readable code means is generated for issuing a first special command to add a new IP multicast address providing a group multicast address and an IP multicast address. Then computer readable code means is created for entering said special control command in a multicast routing table, one entry per connection request received. Computer readable code means is then provided for a use count mechanism for keeping track of numbers of communication stacks which have registered with a certain IP multicast address. Also computer readable code means is generated for comparing all inbound IP packets destined for an IP multicast address with said entries in said table and routing all matches to their appropriate communication stacks.

11 Claims, 10 Drawing Sheets

```
                    BASE ENTRY (710)                          COLLISION CHAIN (750)
        161    ┌─────────────────────────────┐         ┌─────────────────────────────┐
               │ IP=224.1.2.3  (721)         │────────▶│ IP=224.2.2.3  (722)         │
               │ MAC=80:00:10:5E:00:01 (731) │         │ MAC=80:00:10:5E:00:03 (732) │
               │ TCP/IP ADDRS: 10,15,34      │         │ TCP/IP ADDRS: 10,15,27,34   │
               │ USE COUNT: 3  (741)         │         │ USE COUNT: 4  (742)         │
               └─────────────────────────────┘         └─────────────────────────────┘

(711)
               ┌─────────────────────────────┐
               │ IP=224.2.6.8  (723)         │
               │ MAC=80:00:10:5E:00:25 (733) │
               │ TCP/IP ADDRS: 10,27,56      │
               │ USE COUNT: 3  (743)         │
               └─────────────────────────────┘
```

| B4 | 00 | nnnn | 0000 | LT | LN | CNT | 0000 | 0000 | VER | IP ADDR | MAC ADDR | PAD |
|----|----|------|------|----|----|-----|------|------|-----|---------|----------|-----|
| 0  | 1  | 2    | 4    | 6  | 7  | 8   | 10   | 12   | 14  | 16      | -/-      |     |

WHERE:

nnnn— SEQUENCE NUMBER FIELD—TWO BYTE FIELD CONTAINING A S/390 INTEGER SEQUENCE COUNTER. EACH COMMAND INITIATOR MAINTAINS ITS OWN SEQUENCE COUNT, WHICH STARTS AT ZERO FOR THE FIRST COMMAND, AND IS SERIALLY INCREMENTED (BY ONE) FOR EACH SUBSEQUENT COMMAND. THE RESPONSE STRING WILL CONTAIN THE SAME SEQUENCE NUMBER ECHOED BACK.

LT— ADAPTER TYPE CODE—ONE BYTE FIELD INDICATING THE ADAPTER TYPE CODE.
1=ETHERNET
2=TOKEN RING
7=FDDI

LN— RELATIVE ADAPTER NUMBER—ONE BYTE FIELD INDICATING THE RELATIVE ADAPTER NUMBER.

VER— 2 BYTE FIELD—VERSION SUPPORTED FOR THIS COMMAND (VALID ENTRIES ARE 4(IP V4) OR 6(IP V6)).

CNT— COUNT FIELD—2 BYTE FIELD(UNSIGNED INTEGER) CONTAINS THE NUMBER OF IP MULTICAST/MAC ADDRESS PAIRS WHICH ARE INCLUDED IN THE COMMAND.

IP ADDR— IP MULTICAST ADDRESS OF THE CONNECTION. THIS IS A 4 OR 16 BYTE FIELD DEPENDING ON THE VALUE OF THE VERSION ID. (V4=4BYTES, V6=16BYTES).

MAC ADDR— THE LAN MULTICAST MAC ADDRESS ASSOCIATED WITH THE IP MULTICAST ADDRESS. THIS IS A 6 BYTE FIELD.

PAD— TWO BYTES OF 0x00 TO PAD MAC ADDRESS TO 4 BYTE BOUNDARY.

FIG.6A

| B4 | 00 | nnnnn | RC | LT | LN | CNT | ASTS | ASTE | VER | DATA |
|----|----|-------|-----|----|----|-----|------|------|-----|------|
| 0  | 1  | 2     | 4   | 6  | 7  | 8   | 10   | 12   | 14  | 16  -/- |

WHERE:

nnnnn— SEQUENCE NUMBER FIELD—TWO BYTE FIELD CONTAINING A S/390 INTEGER SEQUENCE COUNTER. EACH COMMAND INITIATOR MAINTAINS ITS OWN SEQUENCE COUNT, WHICH STARTS AT ZERO FOR THE FIRST COMMAND, AND IS SERIALLY INCREMENTED (BY ONE) FOR EACH SUBSEQUENT COMMAND. THE RESPONSE STRING WILL CONTAIN THE SAME SEQUENCE NUMBER ECHOED BACK.

RC— COMMAND RETURN CODE. 2 BYTE FIELD INDICATING THE RETURN CODE STATUS.

RC VALUES:

| VALUE  | DESCRIPTION | CNT # | DATA LENGTH (IN BYTES) |
|--------|-------------|-------|------------------------|
| 0x0000 | SUCCESS | 0 | 0 |
| 0x0001 | COMMAND NOT SUPPORTED | 0 | 0 |
| 0xE001 | DATA FIELD MISMATCH (V6 TYPE WITH V4 DATA FIELD SIZE OR VICE VERSA) | 0 | 0 |
| 0xE003 | INVALID LAN TYPE OR LAN NUMBER | 1 | 2 (RETURNS LAN TYPE FOLLOWED BY LAN NUMBER) |
| 0xE004 | IP MULTICAST ADDRESS TABLE FULL | 1 | 4 (RETURNS MAX NUMBER OF CONNECTIONS WE SUPPORT. CURRENTLY MAX = 16) |

FIG.6B(1)

| FIG.6B(1) | FIG.6B(2) |

FIG.6B

| | |
|---|---|
| 0xE005 | INVALID MULTICAST ADDRESS |
| 0xE005 | INVALID MULTICAST ADDRESS |

LT— ADAPTER TYPE CODE—ONE BYTE FIELD INDICATING THE ADAPTER TYPE CODE.
  1=ETHERNET
  2=TOKEN RING
  7=FDDI

LN— RELATIVE ADAPTER NUMBER—ONE BYTE FIELD INDICATING THE RELATIVE ADAPTER NUMBER.

VER— 2 BYTE FIELD—VERSION SUPPORTED FOR THIS COMMAND (VALID ENTRIES ARE 1 (SNA), 4(IP V4), OR 6(IP V6)).

ASTS— 16 BIT FIELD—TCP/IP ASSISTS SUPPORTED (INFORMATION VALID ONLY IN REPLY FRAMES). THE BIT FIELDS ARE DEFINED AS FOLLOWS (BIT ON SIGNIFIES SUPPORTED) ASSIST LIST:
  ARP PROCESSING— BIT 0 (0x0001)
  INBOUND CHECKSUM SUPPORT— BIT 1 (0x0002)
  OUTBOUND CHECKSUM SUPPORT— BIT 2 (0x0004)
  IP FRAGMENTATION/REASSEMBLY— BIT 3 (0x0008)
  FILTERING— BIT 4 (0x0010)
  IP V6 SUPPORT— BIT 5 (0x0020)

ASTE— 16 BIT FIELD—TCP/IP ASSISTS ENABLED (INFORMATION VALID ONLY IN REPLY FRAMES).

CNT— COUNT FIELD— 2 BYTE FIELD (UNSIGNED INTEGER) CONTAINS THE NUMBER OF PARAMETERS THAT ARE INCLUDED IN THE COMMAND DATA FIELD.

DATA— RC CODE DEPENDENT DATA.

FIG.6B(2)

| B5 | 00 | nnnn | 0000 | LT | LN | CNT | 0000 | 0000 | VER | IP ADDR | MAC ADDR | PAD |
|----|----|------|------|----|----|-----|------|------|-----|---------|----------|-----|
| 0  | 1  | 2    | 4    | 6  | 7  | 8   | 10   | 12   | 14  | 16      | —/—      |     |

WHERE:

nnnn— SEQUENCE NUMBER FIELD–TWO BYTE FIELD CONTAINING A S/390 INTEGER SEQUENCE COUNTER. EACH COMMAND INITIATOR MAINTAINS ITS OWN SEQUENCE COUNT, WHICH STARTS AT ZERO FOR THE FIRST COMMAND, AND IS SERIALLY INCREMENTED (BY ONE) FOR EACH SUBSEQUENT COMMAND. THE RESPONSE STRING WILL CONTAIN THE SAME SEQUENCE NUMBER ECHOED BACK.

LT— ADAPTER TYPE CODE–ONE BYTE FIELD INDICATING THE ADAPTER TYPE CODE.
1=ETHERNET
2=TOKEN RING
7=FDDI

AUG

LN— RELATIVE ADAPTER NUMBER–ONE BYTE FIELD INDICATING THE RELATIVE ADAPTER NUMBER.

VER— 2 BYTE FIELD–VERSION SUPPORTED FOR THIS COMMAND (VALID ENTRIES ARE 4(IP V4) OR 6(IP V6)).

CNT— COUNT FIELD–2 BYTE FIELD(UNSIGNED INTEGER) CONTAINS THE NUMBER OF IP MULTICAST/MAC ADDRESS PAIRS WHICH ARE INCLUDED IN THE COMMAND.

IP ADDR— IP MULTICAST ADDRESS OF THE CONNECTION. THIS IS A 4 OR 16 BYTE FIELD DEPENDING ON THE VALUE OF THE VERSION ID. (V4=4BYTES, V6=16BYTES).

MAC ADDR— THE LAN MULTICAST MAC ADDRESS ASSOCIATED WITH THE IP MULTICAST ADDRESS. THIS IS A 6 BYTE FIELD.

PAD— TWO BYTES OF 0x00 TO PAD MAC ADDRESS TO 4 BYTE BOUNDARY.

FIG.6C

| 0 | 1 | 2 | 4 | 6 | 7 | 8 | 10 | 12 | 14 | 16 | -/- |
|---|---|---|---|---|---|---|---|---|---|---|---|
| B5 | 00 | nnnnn | RC | LT | LN | CNT | ASTS | ASTE | VER | DATA | |

WHERE:

nnnnn— SEQUENCE NUMBER FIELD—TWO BYTE FIELD CONTAINING A S/390 INTEGER SEQUENCE COUNTER. EACH COMMAND INITIATOR MAINTAINS ITS OWN SEQUENCE COUNT, WHICH STARTS AT ZERO FOR THE FIRST COMMAND, AND IS SERIALLY INCREMENTED (BY ONE) FOR EACH SUBSEQUENT COMMAND. THE RESPONSE STRING WILL CONTAIN THE SAME SEQUENCE NUMBER ECHOED BACK.

RC— COMMAND RETURN CODE. 2 BYTE FIELD INDICATING THE RETURN CODE STATUS.

RC VALUES:

| VALUE | DESCRIPTION | CNT # | DATA LENGTH (IN BYTES) |
|---|---|---|---|
| 0x0000 | SUCCESS | 0 | 0 |
| 0x0001 | COMMAND NOT SUPPORTED | 0 | 0 |
| 0xE001 | DATA FIELD MISMATCH (V6 TYPE WITH V4 DATA FIELD SIZE OR VICE VERSA) | 0 | 0 |
| 0xE003 | INVALID LAN TYPE OR LAN NUMBER | 1 | 2 (RETURNS LAN TYPE AND LAN NUMBER) |
| 0xE00B | IP ADDRESS NOT FOUND | 1 | 0 |
| 0xE006 | ALL MULTICAST ADDRESSES NOT SUCCESSFULLY DELETED | n | 0 (COUNT IS THE NUMBER OF ADDRESSES SUCCESSFULLY DELETED) |

| FIG.6D(1) |
|---|
| FIG.6D(2) |

LT— ADAPTER TYPE CODE—ONE BYTE FIELD INDICATING THE ADAPTER TYPE CODE.
1=ETHERNET
2=TOKEN RING
7=FDDI

LN— RELATIVE ADAPTER NUMBER—ONE BYTE FIELD INDICATING THE RELATIVE ADAPTER NUMBER.

VER— 2 BYTE FIELD—VERSION SUPPORTED FOR THIS COMMAND (VALID ENTRIES ARE 1 (SNA), 4(IP V4), OR 6(IP V6)).

ASTS— 16 BIT FIELD—TCP/IP ASSISTS SUPPORTED (INFORMATION VALID ONLY IN REPLY FRAMES). THE BIT FIELDS ARE DEFINED AS FOLLOWS (BIT ON SIGNIFIES SUPPORTED)

ASSIST LIST:
ARP PROCESSING—              BIT 0 (0x0001)
INBOUND CHECKSUM SUPPORT—    BIT 1 (0x0002)
OUTBOUND CHECKSUM SUPPORT—   BIT 2 (0x0004)
IP FRAGMENTATION/REASSEMBLY— BIT 3 (0x0008)
FILTERING—                   BIT 4 (0x0010)
IP V6 SUPPORT—               BIT 5 (0x0020)

ASTE— 16 BIT FIELD—TCP/IP ASSISTS ENABLED (INFORMATION VALID ONLY IN REPLY FRAMES).

CNT— COUNT FIELD— 2 BYTE FIELD (UNSIGNED INTEGER) CONTAINS THE NUMBER OF PARAMETERS THAT ARE INCLUDED IN THE COMMAND DATA FIELD.

DATA— RC CODE DEPENDENT DATA.

FIG.6D(2)

IP MULTICAST INTERFACE

FIELD OF INVENTION

The present invention is generally directed to an IP multicast interface used in network connections with gateway devices.

BACKGROUND OF THE INVENTION

Personal computers are gaining widespread popularity as the state of technology is improving. Over the past few decades, their utilization has proliferated both for personal purposes and for use in business and scientific communities. Establishing good computing communications have become a necessity as individual users try to connect to one another for exchange of information, and to larger computers to take advantage of their higher processing capabilities. This need to communicate between different computing hosts or nodes have evolved into the creation of distributed networks. A distributed network is an aggregate of individual systems that are connected to one another electronically. Distributed networks can be organized in a number of ways, either remotely extending over great distances using wide area networks or WANs, or locally through the use of a Local Area Network, better known as a LAN.

A LAN usually consists of a number of nodes or hosts located within an office, a building or at other close proximations. Being a type of a distributed network, a LAN loosely couples processors and workstations. Generally, workstations on a LAN do not share a central memory but do share common servers. In this way a LAN increases the power and flexibility of workstations by enabling them to access shared data without jeopardizing the security of each individual resource.

A LAN system that has been in wide use in recent years is produced by Novell, Inc. of Provo, Utah. In a Novell system, a LAN device driver is implemented on top of the local operating systems to be coupled and device driver commands at the LAN workstations are directed to and from the workstations onto the LAN to the target servers.

As networks have grown and particularly as LANs have come into widespread use, many businesses and organizations have faced the necessity of interconnecting and managing a confederation of networks and LANs. Each network itself can in turn comprises of a plurality of logical networks which in turn run independent and different networking protocols. The challenge has not become only to interconnect local area networks to one another, but to do so and still provide remote server access through WANs or other devices.

Three basic methods are now available to interconnect both local and remote area networks to one another as to provide wide used access and remote information exchange capabilities. These three methods are 1) bridges or data-link devices that connect similar networks together; 2) routers that perform routing services by maintaining a routing table in each host; and 3) gateway devices that carry out protocol conversions and other connectivity functions. Typically, a device driver for the gateway is provided with modems or other physical ports that can be linked to switched communication WANs.

A gateway facility allows the interconnection of multiple independently controlled communication networks to one another in a way that logical units in the network can communicate with one another without any changes to the network. A logical network runs a single networking protocol, but a processing organization can be composed of a dozen of logical networks running six or seven networking protocols. A gateway provides transparent interconnection of these single networking protocols, so that a single multiport transport network is formed.

In the existing mechanisms, gateway devices are implemented on top of the LAN device drivers as a switched communications device interface. The user initialization of the communication link-up procedure redirects the user hardware commands to the gateway. The communications interface in the gateway driver then institutes and maintains the swithched communications link, diverting hardware resources of the driver to do so. The connection and access procedures are then executed using the gateway ports and modems in order to lick the user's system with the switched communications network. A remote connection is established through the LAN/WAN which sets up a point to point configuration through the port along the communication line between the user and the communications device in use.

The procedure described above have many complexities associated with it. The complexities connected with the configuration assessment of gateway divices is an on-going concern of the disigners of such divices today. These configuration concerns contributes to many limitations that exist with today's gateway devices. These limitations often make the interconnection of networks running different protocols non-transparent. Because many of the present gateways are transport layer protocol-specific, it is possible that a gateway cannot interconnect a network running for example a TCP/IP protocol and a network running the SNA protocol. Furthermore, a variety of gateway devices have been developed which connect TCP/IP to different operating system and give connectivity to the LAN/WAN environments, but each time the configuration has to be redefined and reassessed before connectivity is accomplished successfully. Furthermore, each gateway device can usually implement only a subset of the TCP/IP functions. Most currently existing gateway devices do not support many of the TCP/IP functions and performance problems have been encountered due to increased bandwidth of the LAN/WAN arenas. One of the communication protocols used to communicate with the gateway is LCS or LAN Channel Station. A control command interface exists in the LCS protocol that requires all the configuration information to be set prior to the TCP/IP connect sequence. Nonetheless, the control interface does not have a command sequence to enable the use of the TCP/IP functions which have been implemented in the gateway devices. To reduce the complexity of configuring gateway devices, an expanded control command interface is needed.

This application incorporates by reference pending application, Ser. No. 08/921,432, now U.S. Pat. No. 5,999,974 issued Dec. 7, 1999.

This application is being filed with the following related applications on the same date—Ser. Nos. 09/140,180; 09/139,948 and 09/139,684.

SUMMARY OF THE INVENTION

A computer program product for use with a computer system having a host and a plurality of clients coupled to one another via a local area network (LAN), to provide a multicasting of messages using a special command set. First computer readable code means is generated for issuing a first special command to add a new IP multicast address providing a group multicast address and an IP multicast address. Then computer readable code means is created for entering said special control command in a multicast routing table, one entry per connection request received. Computer readable code means is then provided for a use count mechanism for keeping track of numbers of communication stacks which have registered with a certain IP multicast address. Also computer readable code means is generated for comparing all inbound IP packets destined for an IP multicast address with said entries in said table and routing all matches to their appropriate communication stacks.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
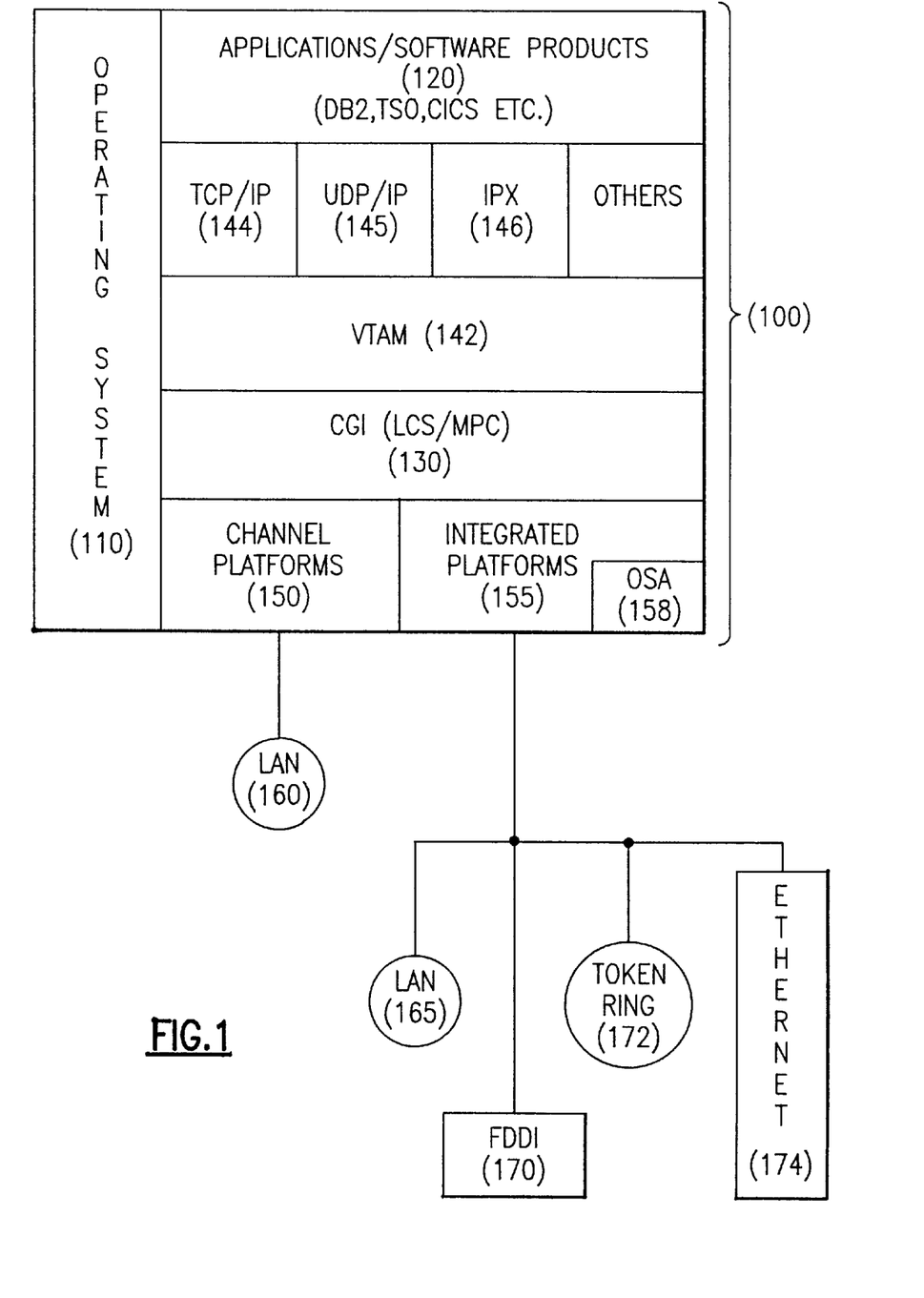
FIG. 1 is a block diagram illustration of a computing environment.

FIG. 1 is an illustration of an example showing the connection of a large computing network environment, such as one provided by a large mainframe computer, to a Local Area Network (LAN) like the Internet. The large rectangle in FIG. 1 shown at 100 is a computing network environment such as an IBM S/390 computer. The operating system(s) for the computing environment is shown as 110 and can be one of many available operating systems such as OS/390 or MVS/ESA. At the next layer, shown at 120, the software products and applications reside, some examples being DB2, TSO, CICS, and IMS. The Common Gateway Interface or CGI is shown at 130 and interfaces with the communication devices such as an IBM Internet Connection Server, to access VTAM (shown at 142), TCP/IP (shown at 144), IPX (shown at 146) or other similar communication protocols. The network connection to the LAN and/or Internet (shown at 160–174) can be accomplished by means of any indicated communications controller, such as an Open Systems Adapter connection, hereinafter OSA. The network connection from the computing environment servers can be a channel (150) or an integrated platform (155) connection. An Open System Adapter or an OSA shown at 158 is an integrated connectivity platform and a product of IBM Corp. of Armonk. OSA provides direct attachment to token ring (shown at 172), ethernet (shown at 174), FDDI's or fiber distributed data interfaces, and ATM (not shown). Multiple host systems can be accessed from a single workstation through a single OSA LAN/WAN port. Integrated on the OSA card is a channel adapter, a control unit and LAN adapters. OSA supports a variety of communication protocols, namely SNA/APPN, TCP/IP and IPX. OSA allows the sharing of applications and/or LAN ports among logical partitions.

There are many protocols used to connect the communication stacks, for example CS/390 TCP/IP Stack, to a channel attached platform or an integrated platform such as the OSA. In the following sections, the teachings of the present invention may be described in reference with a system using OSA and CS/390 in a setup using TCP/IP with MVS operating system. However, the workings of the present invention is not limited to the use of OSA, CS/390, MVS or TCP/IP and any such reference will be used for demonstrative purposes only.

A variety of gateway devices have been developed which connect to TCP/IP and give connectivity to LAN/WAN environment. In the existing systems, when a host is communicating with a LAN or other similar networks a Media Access Control Header, also known as a MAC Address, along with the LAN type, has to be first established so that the host and the LAN understand what kind of device and at what address the communication is being determined to address the particular needs of one another.

Figure 2:
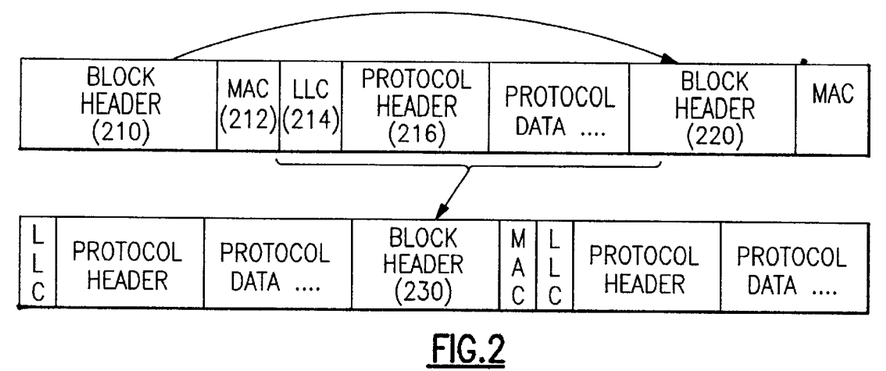
FIG. 2 depicts the header format including a LAN MAC header for a block of data.

FIG. 2 shows how a block of data may be transferred in the existing systems. A Block Header 210 can indicate the start of a new data batch. Each block header 210 is usually followed by the appropriate MAC Header or MAC Address and LLC shown at 212 and 214. The Protocol header and the Protocol data follow as shown in 216 and 218. A new block of data is shown at 220 and 230. Usually the applications receive user data which is to be sent to the LAN in a data buffer. The applications send the user data to the protocol layer.

Building a MAC header and the deciphering of data each time is not an easy task. In a large communicating environment, each time the host and LAN devices communicate a MAC Header has to be created which can be both inefficient in terms of time and memory consumption. Each time communication is to be established information including the device(s) address on both the sending and receiving ends, MAC header, LAN type, device type, protocol versioning and the like has to be exchanged. This process requires substantial user configuration in existing systems.

With the addition of some new TCP/IP functions, such as International Business Machines' Offload and Assist functions (see the aforementioned related U.S. Pat. No. 5,999, 974), the configuration process can become an insurmountable task. Some platforms such as "Assist" and "Offload" have varying degrees of functionality which each requires its own specific type of configuration file. As new TCP/IP functions are being added, the configuration process in these platforms continues to grow in coplexity.

Figure 3:
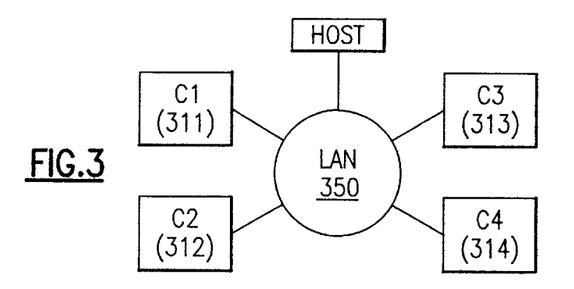
FIG. 3 is a block diagram illustration of the prior art showing a computing environment.

One such function is the Video Conferencing function that can be performed with the TCP/IP protocol. FIG. 3 is an illustration of the prior art showing a multicast computing environment. A multicast environment is used for many purposes today, one example being video-conferencing. In way of example, if clients C2 312 and C4 314 are to participate in a video-conferencing session only, as depicted by FIG. 3, there must be a way to allow them to do so without clients C1 311 and C3 313 being affected. To do so all clients have to be listening at all times to all broadcasted messages to determine which one is intended for them. The broadcasted message usually contain the MAC header followed by an IP Packet header. Each client has to listen at all times and check all messages until it finds the broadcasted message with the correct MAC header and IP address. This process is very inefficient and can tie up both time and resources. This problem is even more noticeable when working with TCP/IP functions.

The most common implementation used today for TCP/IP platforms such as "Assist" and "Offload" is to run the LAN Device Driver on the platform itself. The remaining functions supported on these platforms vary from platform to platform. All implementations which have the device driver on the platform and the IP protocol which supports the IP Multicast function on a separate platform need to communicate the necessary IP Multicast information to each other. The current method used today is to have the user enter this information on both platform's configured files. This adds yet another level of complexity to the TCP/IP configuration. Many of these implementations have no means of ensuring the accuracy and verifying that the matching IP Multicast information is centered in both of the platforms.

One of the new TCP/IP functions being exploited in the TCP/IP network is the use of IP Multicast Addressing. The IP Multicast Addressing is being used to try and reduce the Broadcast traffic which is currently being used for many of the currently supported routing protocols. Some of the new IP protocols which are using multicast are OSPF (Open Shortest Path First) and RIP2 (Routing Information Protocol 2).

For all IP Multicast Addresses supported by a TCP/IP stack, a corresponding LAN MAC Group address must be registered with the device driver connected to the LAN media. This is needed because the IP Multicast packets are encapsulated inside a LAN Multicast packet. This LAN Multicast packet will only be received by a LAN Device Driver which has registered the proper LAN MAC Multicast Address with the LAN adapter.

Figure 4:
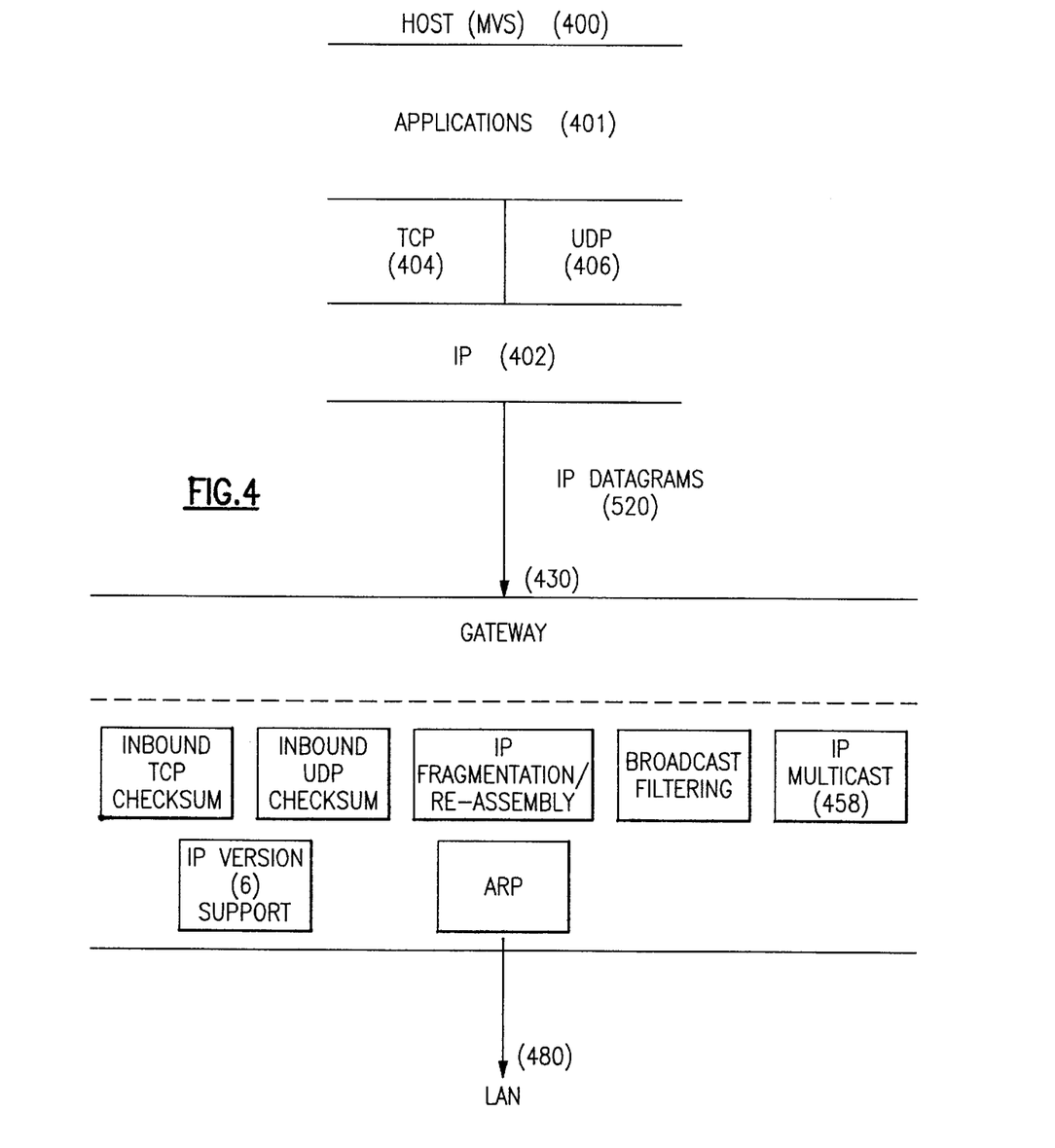
FIG. 4 depicts a diagram showing different functions available such as IP Multicast function in a computing network environment.

FIG. 4 is an illustration of the workings of the related invention disclosed in the aforementioned U.S. Pat. No. 5,999,974. FIG. 4 provides some of the functions supported and used by TCP/IP and on the OSA platform. These functions include IP Multicast. The host and its operating system and applications is shown at 400 and 401 respectively. The IP protocols are shown at 402 (IP) and TCP and UDP at 404 and 406, respectively. The TCP/IP or UDP/IP functions available are shown at 440. IP Multicast is one of these functions as shown at 458. (Multiple other applications can be supported as well such as SAP and RIP). The LAN connection is shown at 380 and the gateway connection at 430.

In such setups, usually a control command interface exists in the gateway device to allow TCP/IP or other protocols to connect to the gateway device in order to begin data transfers. However, this control command interface requires all the configuration information to be set prior to the TCP/IP connect sequence. Furthermore, the control interface does not have a command sequence to enable the use of the TCP/IP functions which have been implemented in the gateway device. The TCP/IP program product running on such operating systems as MVS and VM/VSE have been developed by a number of companies. But many of today's TCP/IP implementations have encountered performance problems due to the increased bandwidth of the LAN/WAN arenas. To try and improve the MVS and other similar operating system's performance using TCP/IP or other communication protocols, various TCP/IP functions have been identified which could better be implemented in a gateway device which has LAN/WAN connectivity.

To solve the IP Multicast configuration problem, the present invention uses a new type of control command. This control command is sent from the platform which desires to add a specific IP Multicast address to the platform containing the device driver which must register the LAN MAC Group address with the LAN adapter. The control command contains the specific IP Multicast Address along with the corresponding LAN MAC Multicast address. The control command contains the specific IP Multicast Address along with the corresponding LAN MAC Multicast address. The platform upon receiving this command will register the LAN MAC Multicast address with the LAN adapter.

The OSA adapter is a type of TCP/IP "Assist" platform. It contains the LAN device driver which interfaces with the LAN media. The IP protocols which support the different IP Multicast functions all currently reside on the operating system connected to the host(s). The OSA adapter can support multiple instances of TCP/IP which could be running on different host images under the operating system. Each image can support different IP Multicast functions. To accommodate this functionality, when the IP Multicast control command is received, the specific host image from which the command was received is registered in a Multicast table. This table entry will contain the host image, IP Multicast Address and LAN MAC Multicast Address. As IP Multicast frames are received from the LAN, the Multicast table will be searched to find all the host images which have registered the specific IP Multicast address. The IP Multicast packet will then be routed only to these one or more specific host images. A host image also needs the ability to remove an IP Multicast Address from the network. To accommodate this requirement, a corresponding Delete IP Multicast command has been developed. This command will cause the IP MAC Multicast Address to be removed from the LAN adapters registration and the IP Multicast address to be removed from the Multicast table.

Figure 5:
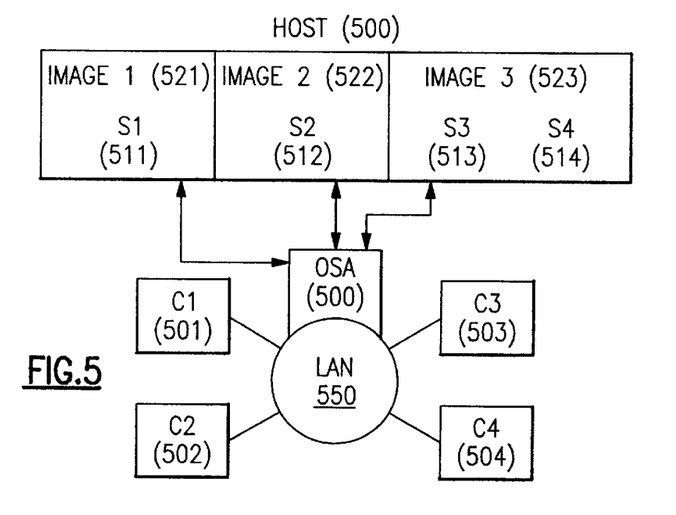
FIG. 5 is a block diagram illustration of a computing environment having a gateway device and a plurality of clients as practiced by one embodiment of the present invention.

FIG. 5 depicts a plurality of clients C1 501, C2 502, C3 503 and C4 504 are in processing communications with at least one host 500 via a LAN 550. The host(s) comprises of a plurality of servers and host images. Server S1 511 corresponds to host image 1 521; server S2 512 corresponds to host image 2 522; and servers S3 513 and S4 514 correspond to host image 3 533. An OSA adapter is also shown at 560 coupled to the LAN. By the use of a SET IPM (IP Multicast) command, at initialization time, hosts images present in the computing network are identified and registered. A corresponding table is provided for storing the characteristics of client, host images including the address, the protocol used and the LAN MAC header information and IP address. The table is then kept dynamically so that with the addition and registration of each new client, host image, the table is updated. When a multicast communication is made the table will be searched for a matching entry. When the corresponding entry is made, the message is routed to all host images which have registered with the corresponding IP multicast address (via SETIPM command). However, if no corresponding match is made in the table, the packet is dropped and resources are freed.

Correspondingly, a Del IPM (IP Multicast) command is also provided to un-register components from the table. Again this updating of the table is done dynamically as new components are registered or un-registered. When a DEL IPM command is used, all corresponding entries in the table will become unavailable for that component or erased.

Routing Table Overview

The OSA Multicast Routing table is built using SETIPM and DELIPM commands from the TCP/IP stack.

The SETIPM command is used to add an entry to the OSA Multicast routing table. The SETIPM commands contain the IP Multicast Address and its associated Group MAC Address. The IP Multicast Address is used to communicate with a group of TCP/IP stations in the network. This group of TCP/IP stations all want to share the data in the network. To perform this task, the TCP/IP data which is sent is packaged as a MAC frame which contains the Group MAC Address which is associated to the IP Multicast address.

The DELIPM command is used to remove an entry from the OSA Multicast Routing Table. The DELIPM command contains the IP Multicast Address to be removed from the OSA Multicast Routing Table. The OSA Multicast Routing table is indexed using a hashing algorithm on the IP Multicast Address. The Routing Table contains a Collision Chain for multiple entries which hash to the same OSA Multicast Routing Table index.

Figure 7:
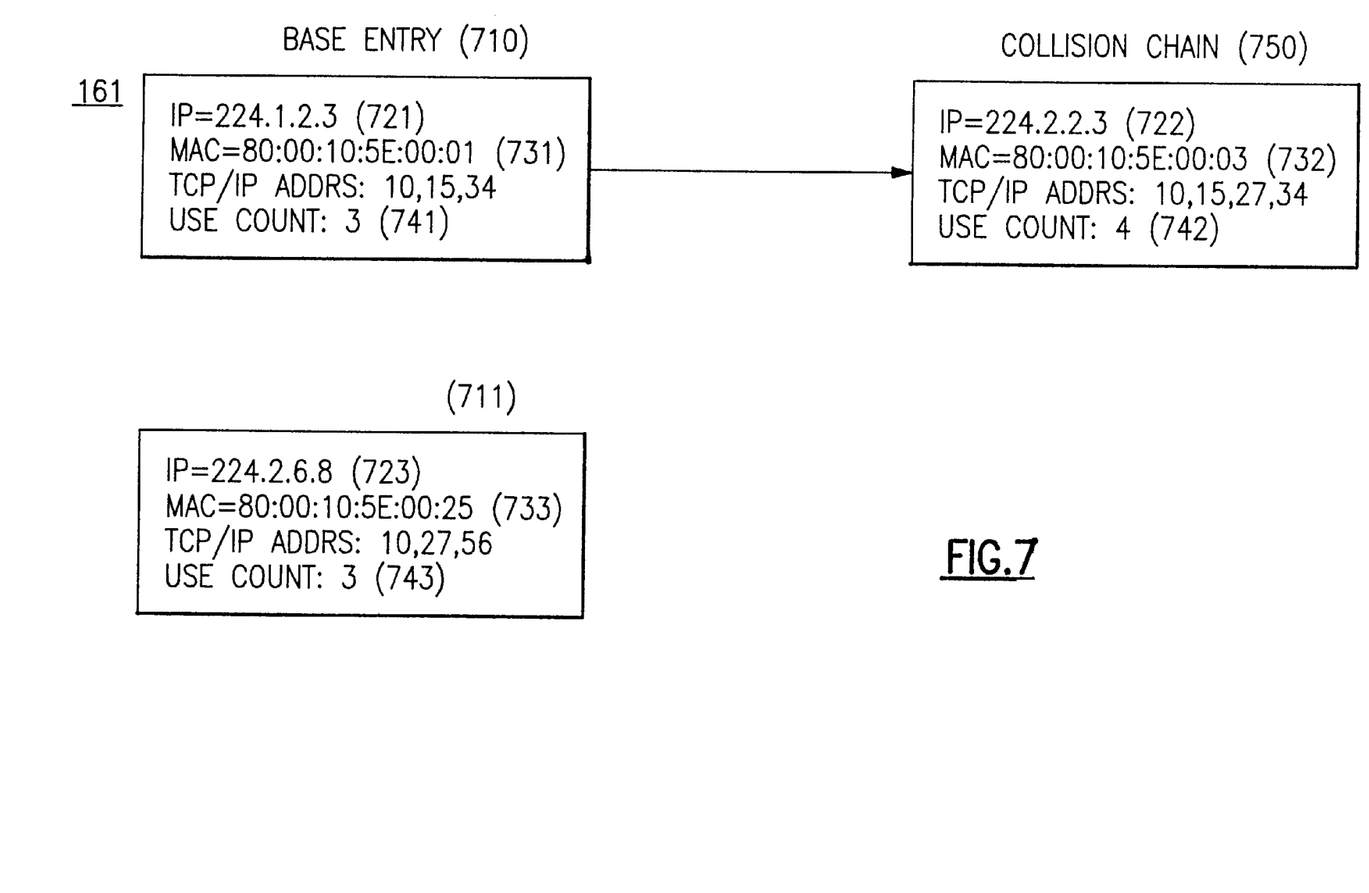
FIG. 7 depicts a multicast routing table example as used by one embodiment of the present invention.

FIG. 7 depicts the concept of Routing Table. Use count 741–743 provides how many times the IP address was registered by for different and separate images or sub-environments. Each SETIPM will increment this count while each DELIPM decrements this count. The IP address and the MAC group address is provided for each entry in 721–723 and 731–733 respectively. The base entry is provided at 710 while the Collision chain is provided as 750.

SETIPM Command and Flow

In an embodiment of the present invention the OSA receives a SETIPM command from CS/390 as the TCP/IP stack receives connection requests from TCP/IP application requesting IP Multicast services. For each connection request received, the CS/390 TCP/IP stack builds a corresponding SETIPM command. This registers the IP Multicast Address and its corresponding MAC Group Address with the OSA adapter. The OSA adapter then updates its Multicast Routing table with the SETIPM information. The IP Multicast Address is hashed to compute a one byte index into the IP Multicast Address table. If the entry being added is a new entry, a new entry is allocated in the table. A collision chain is kept for entries which Hash to the same index. The uniqueness in this implementation is that OSA can have connections to multiple OS/390 Multicast Routers in the same or different virtual modes or Host Partitions (LPARs). OSA can therefore receive the same SETIPM information from multiple different CS/390 TCP/IP stacks. Since each CS/390 TCP/IP stack can register with the same IP Multicast Addresses, OSA must be able to Route inbound IP packets destined for an IP Multicast Address to all of the CS/390 TCP/IP stacks which have registered with the OSA adapter. OSA keeps a "use count" in its routing table entries. The "use count is used to track the number of CS/390 TCP/IP stacks which have registered with the IP Multicast Address. The entry also contains the list of CS/390 TCP/IP stacks which have registered with the IP Multicast Address. This is the list used to forward inbound IP Multicast packets to all the registered CS/390 TCP/IP Stacks.

Figure 6A:
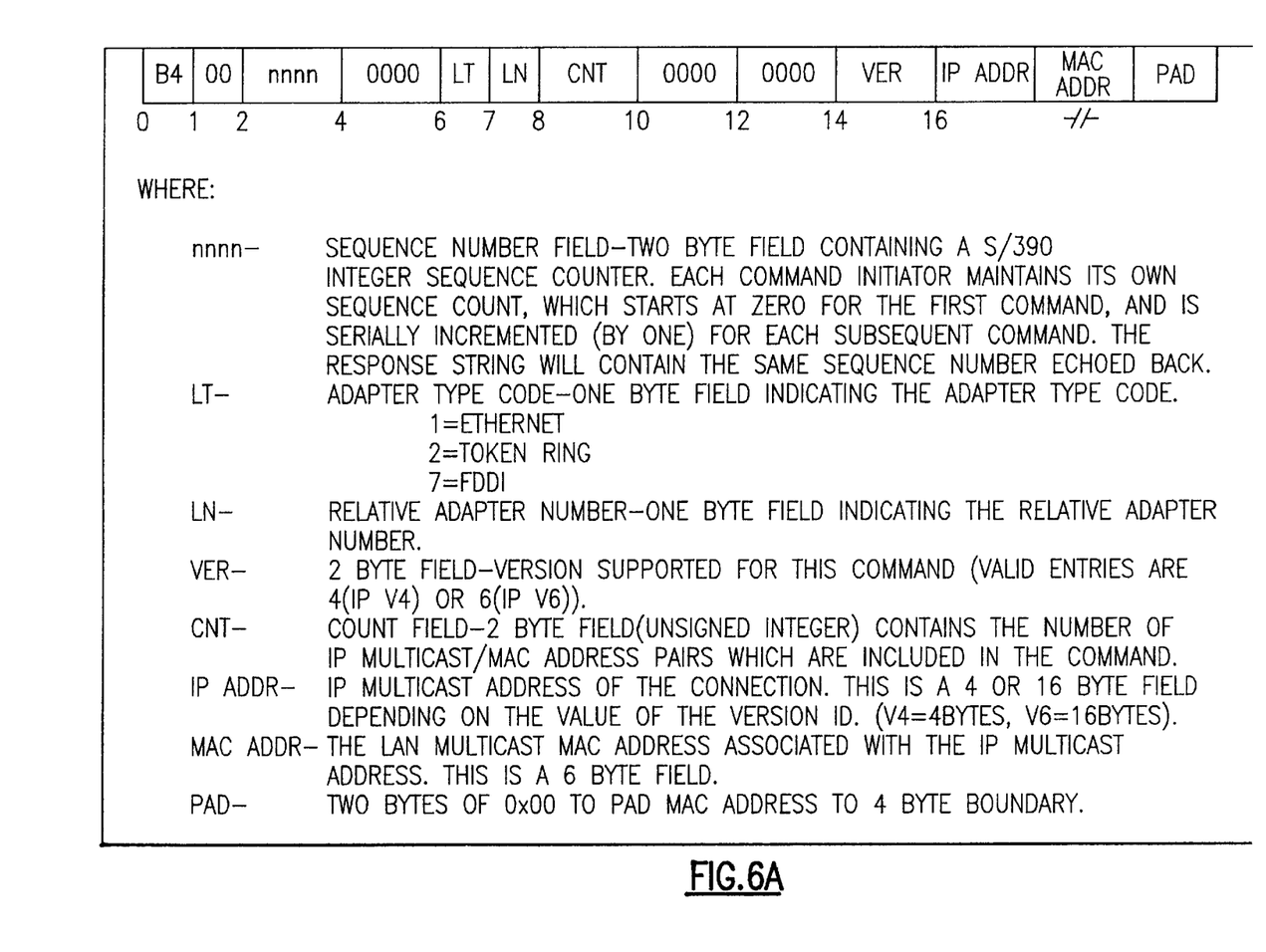
FIGS. 6A and 6B, and 6C and 6D are tables showing values at the onset of SETIPM and DELIPM commands respectively.
Figure 6B:
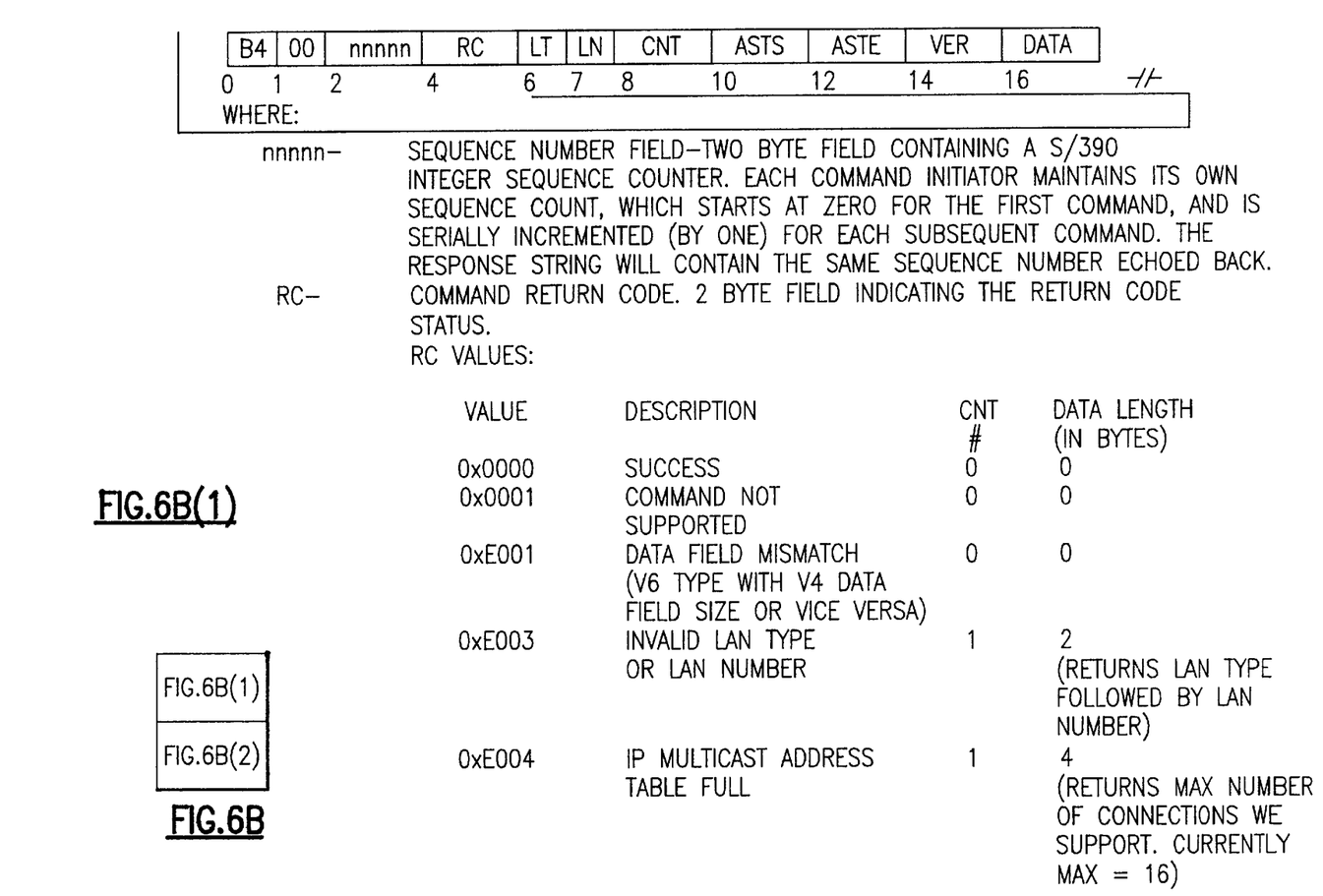

FIGS. 6A and 6B are tables composed of the information obtained at onset of SETIPM command.

DELIPM Command

The DELIPM command is used by CS/390 TCP/IP stacks to unregister IP Multicast Addresses from the OSA adapter. Entries are removed when either the CS/390 TCP/IP applications issue a Disconnect for the TCP/IP session or the TCP/IP stack itself is shutdown. When an entry is removed from the OSA Multicast Routing Table, the "use count" in the entry is decremented. If the "use count" is still non-zero, the CS/390 TCP/IP stack address is removed from the OSA Multicast Routing Table entry, but the entry will remain active for the other TCP/IP stacks. Once the "use count" goes to 0×00, the entry is then removed from the OSA Multicast Routing table.

Figure 6C:
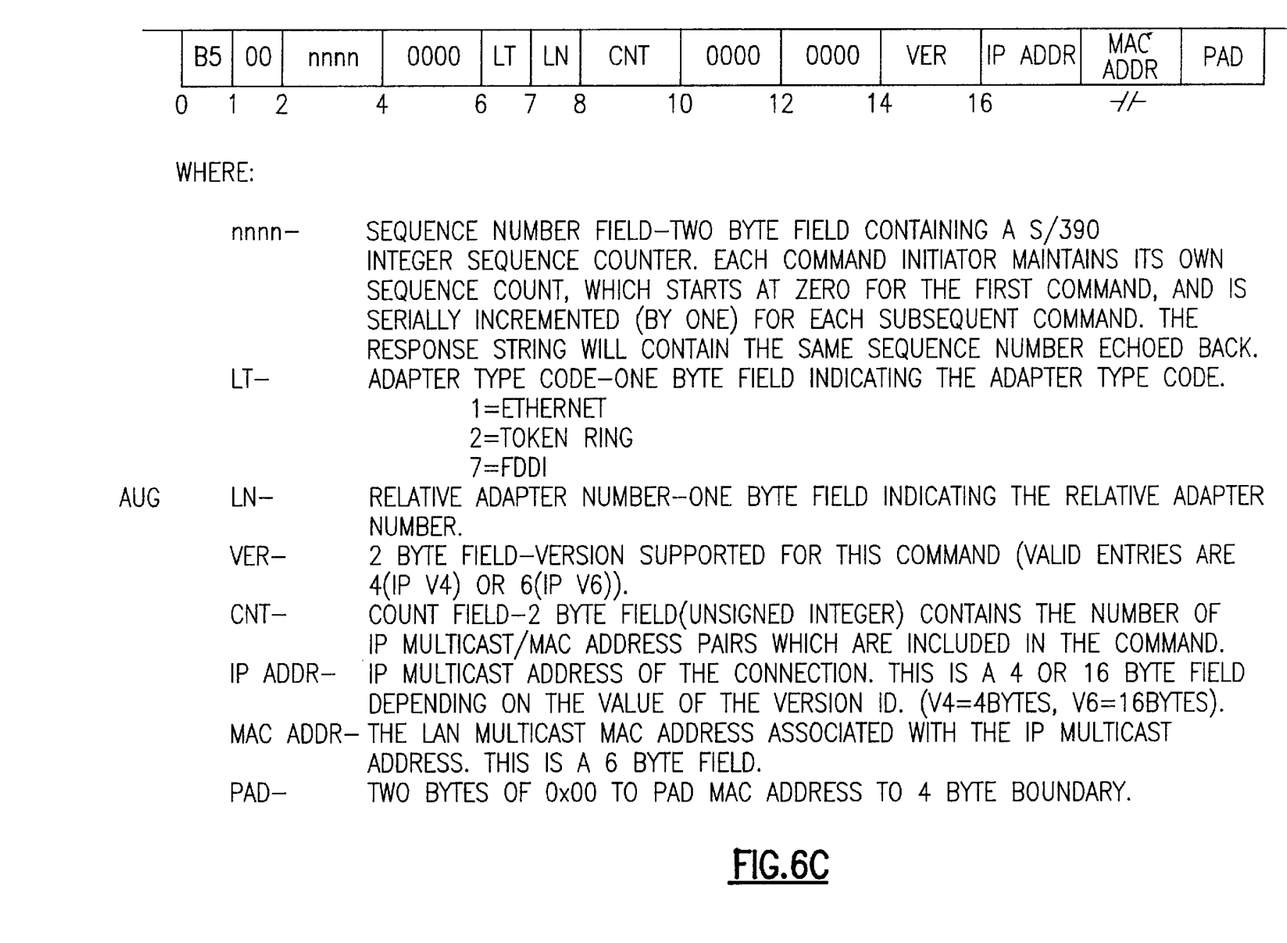
Figure 6D:
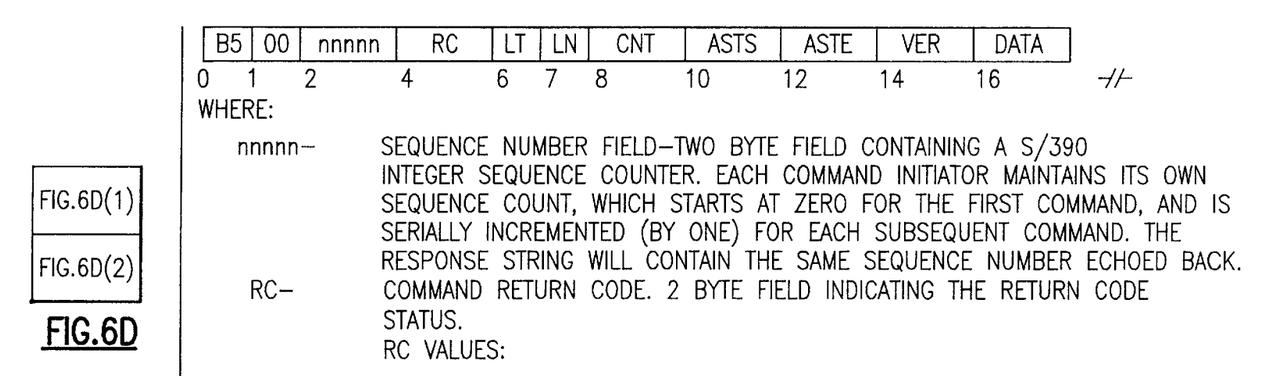

FIGS. 6C and 6D are tables composed of the information obtained at onset of DELIPM command.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. A computer program product for use with a computer system, a host and a plurality of clients coupled to one another via a local area network (LAN), to provide a multicasting of messages using a special command set, comprising:

computer readable code means for issuing a first special command to add a new IP multicast address providing a group multicast address and an IP multicast address;

computer readable code means for entering said special control command in a multicast routing table; said table creating at least one entry in said table for each connection request received if said connection request contains a new IP multicast address entry;

computer readable code means for providing a use count mechanism for keeping track of numbers of communication stacks which have registered with a certain IP multicast address, thus allowing different virtual hosts to register new entries;

computer readable code means for comparing all inbound IP packets destined for an IP multicast address with said entries in said table and routing all matches to their appropriate communication stacks.

2. The computer program product of claim 1, wherein an Open System Adapter or OSA platform is used.

3. The computer program product of claim 2, wherein said OSA platform contains a LAN device driver which interfaces with a LAN media.

4. The computer program product of claim 2, wherein said OSA platform can support multiple instances of host images running under an operating system.

5. The computer program product of claim 4, wherein specific host images are also received and registered in said multicast routing table.

6. The computer program product of claim 1, wherein IP multicast frames are received from said LAN to be routed to said appropriate communication stacks.

7. The computer program product of claim 1, wherein a host image has the ability to remove an IP multicast address from a network environment of said LAN.

8. The computer program product of claim 7, wherein said entry is removed from said multicast table once said IP multicast address has been removed from said network environment.

9. The computer program product of claim 8, wherein once said use count contains a zero value said entry is completely removed from said table.

10. The computer program product of claim 8, wherein said entry remains active if said use count does not contain a value of zero.

11. The computer program product of claim 1, wherein said computer system includes a TCP/IP platform and said communication stacks are TCP/IP stacks.

* * * * *